United States Patent [19]

Thaler et al.

[11] Patent Number: 4,652,600
[45] Date of Patent: Mar. 24, 1987

[54] SULFOMALEATION OF POLYOLEFINS (C-1966)

[75] Inventors: Warren A. Thaler, Flemington; Stanley J. Brois, Westfield; Francis N. Ferrara, Dunellen, all of N.J.

[73] Assignee: Exxon Research and Engineering Company, Florham Park, N.J.

[21] Appl. No.: 809,030

[22] Filed: Dec. 16, 1985

Related U.S. Application Data

[63] Continuation-in-part of Ser. No. 778,269, Sep. 20, 1985, Pat. No. 4,587,304.

[51] Int. Cl.[4] ............................................. C08F 8/34
[52] U.S. Cl. .................................. 524/547; 524/572; 524/576; 252/425
[58] Field of Search ............... 542/547, 583, 585, 572, 542/576

Primary Examiner—Paul R. Michl
Attorney, Agent, or Firm—Richard E. Nanfeldt

[57] ABSTRACT

A method for controlling the viscosity of organic liquids, said organic liquid having a solubility parameter of from about 6 to about 10.5, which comprises incorporating into said organic liquid a minor amount of a polymer which is a sulfomaleic anhydride adduct or sulfoester maleic anhydride adduct with an unsaturated hydrocarbon polymer, said adduct being hydrolyzed and neutralized.

9 Claims, 1 Drawing Figure

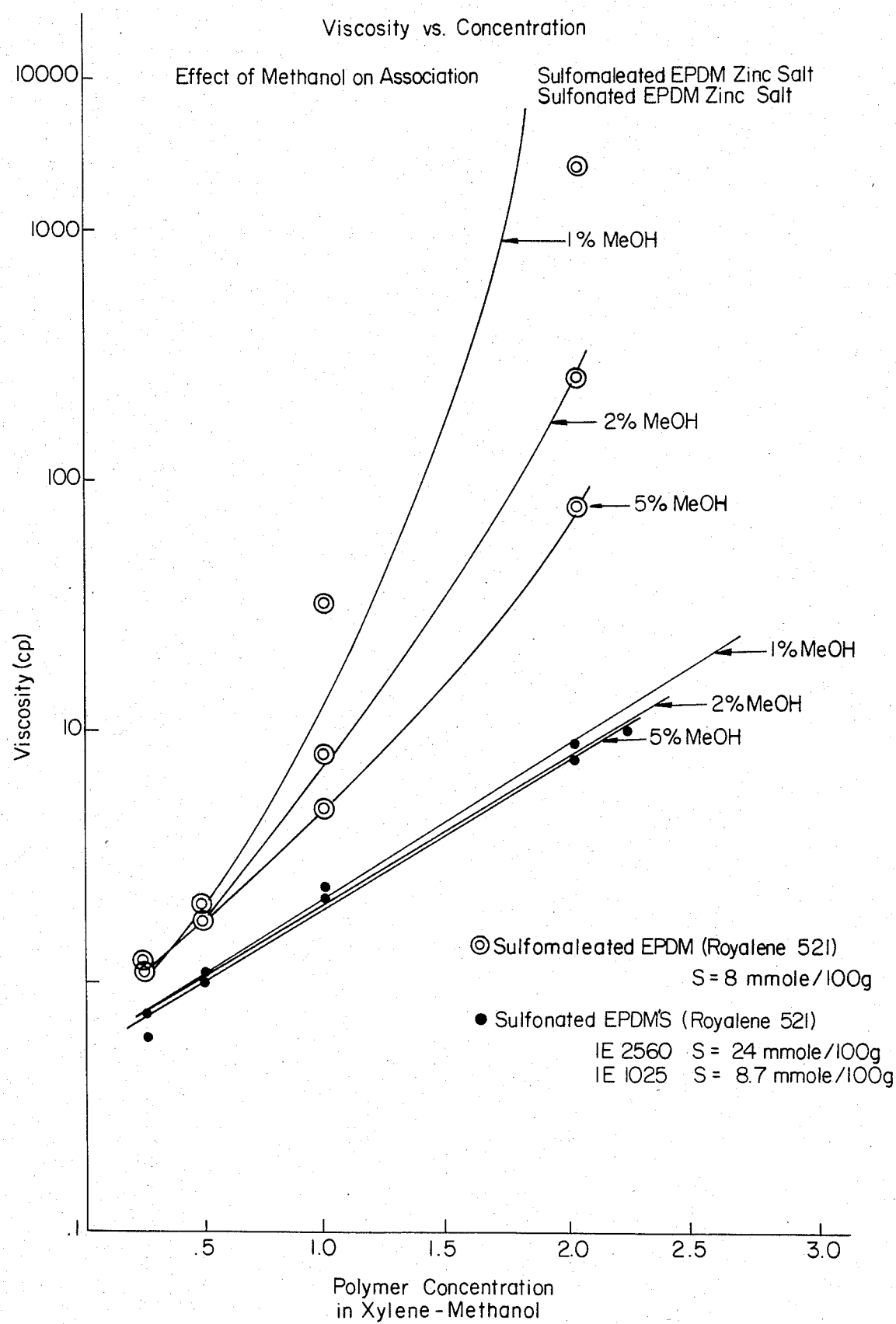

SULFOMALEATION OF POLYOLEFINS (C-1966)

CROSS-REFERENCE TO RELATED APPLICATION

This application is a continuation-in-part of co-pending application U.S. Ser. No. 778,269 filed Sept. 20, 1985, now U.S. Pat. No. 4,587,304.

FIELD OF THE INVENTION

The instant invention relates to a process for controlling the viscosity of organic liquids by incorporating in said liquid a minor amount of a polymer which is a hydrolyzed and neutralized sulfomaleic anhydride adduct with an unsaturated hydrocarbon and, optionally, a cosolvent for the ionic groups of said polymer. A cosolvent is optionally added which will optionally solubilize the polymer groups and provide a reasonable homogeneous mixture of solvent, cosolvent and polymer. The preferred compositions prepared by the method of the instant invention comprise an organic liquid having a solubility parameter of from 6 to 10.5 in combination with the polymer and a non-volatile alcohol or amine as the cosolvent. Solutions of said polymers are unusually resistant to viscosity loss due to polar additives (such as alcohols) or polar impurities.

BACKGROUND OF THE PRIOR ART

The rapid decrease in viscosity of liquids with increasing temperature on polymer concentration is well-known. Ideally, for many applications (automobile lubricants, etc.) it would be desirable to solve this problem so that viscosity would be insensitive to temperature or polymer level. Alternatively, it might be desirable to provide liquid systems whose viscosities actually increase with temperature or increase as polymer level is decreased. It is true that with selected polymeric additives it has been possible to reduce substantially the viscosity change with temperature which does occur with most oils and similar systems. These polymer additives, known as viscosity index improvers (or V.I. improvers) are generally high molecular weight polymers.

The way in which these additives function can be summarized very briefly. In effect, they perform two functions, i.e., thickening, which merely increases fluid viscosity; and Viscosity Index (V.I.) improvement, which corresponds to limited thickening at ambient temperatures and a correspondingly greater thickening at elevated temperatures. This can be accomplished by utilizing a polymeric additive which is poorly solvated by the liquid at ambient temperatures; however, at elevated temperatures the polymer is more highly solvated, such that the polymer expands and is a relatively more effective thickener.

While these V.I. Improvers have proven successful commercially, it is important to note that their effect at reducing viscosity changes with temperatures is rather mild. For a typical base oil containing a suitable V.I. Improver the kinematic viscosity will still decrease by a factor of from 5 to 10 as the temperature increases from 30° C. to 100° C. Obviously, if it is desired to hold the viscosity roughly constant with such temperature changes current technology has not offered an appropriate additive system. Alternatively, it if is desired to hold viscosity reasonably constant as the polymer concentration is decreased conventional wisdom has not previously offered that option.

U.S. Pat. No. 3,396,136 describes how copolymers of alkenyl aromatic sulfonic acids, when properly neutralized, can be employed as thickeners for nonpolar solvents. Those metal sulfonate systems have been shown to be very effective; however, when employed as to component systems (i.e., ionic polymer plus non-polar solvent) the variation of viscosity with increased temperature is very conventional and predictable. That is, the solution viscosity decreases markedly as temperature is increased.

U.S. Pat. No. 3,396,136 further teaches "in situ" neutralization of the sulfonic acid polymer which, under some conditions, can result in the availability of a small amount of polar cosolvent, i.e., a solvent for the sulfonate groups, about equal in amount to the amount of sulfonate groups which are present. This amount of polar cosolvent is not within the limits of the instant invention, which only optionally requires amounts of the third component (which interacts with the ionomeric groups of the ionomer copolymer) at levels which range from 10 to 600 times the molar equivalent of ionic groups. This level of cosolvent is about one to two orders of magnitude or more higher than employed in the cited art. In addition, the cited patent is restricted to aromatic sulfonate polymers. The instant invention describes other polymers, such as sulfonated ethylene propylene terpolymers, sulfonated Butyl, etc., which are a portion of the polymer complex.

U.S. Pat. No. 3,366,430 teaches the gelling of organic liquids by the interaction of polar "associative bonds" which includes hydrogen bonding and "ionic crosslinking". Again, this patent specifies that two components are necessary—the associating polymer (or polymers in some cases) and the non-polar organic liquid. There is no mention of a third polar cosolvent except to point out that such polar liquids should not be present. Specifically, this patent states (at column 2, line 7) that the hydrocarbon liquids to which this invention is to be applied should not contain a substantial portion of a miscible protolytic liquid, such as methanol. It is clear that the language of this patent limits this invention to gels and further that any amount of polar liquids which are present to an extent where they disrupt those gels are undesirable. The instant invention is distinct from that cited in that amounts of such polar compounds as will break up gel at ambient conditions are often desirable and, in fact, the preferred state is free of any said gel at ambient temperatures.

U.S. Pat. No. 3,679,382 teaches the thickening of aliphatic hydrocarbons with synthetic organic polymers which contain olefinically unsaturated copolymerizable acids, amides, hydroxyacrylic esters, sulfonic acids, etc. It is emphasized in this patent (at column 3, line 72) that it is critical that in the preparation of such polymers no surface active agent, catalyst or other additive be employed which introduces a metallic ion into the system. Therefore, it is preferred to employ ammonium or amine salts. It is clear that this invention (U.S. Pat. No. 3,679,382) specifically precludes the use of metallic counterions and is directed towards amine or ammonium derivatives. Metallic counterions are very effective in the instant invention. Finally, this cited patent does describe (at column 7, lines 13-19) that the addition of alcohols will reduce the viscosity of the thickened hydrocarbon and alter flow characteristics thereof.

SUMMARY OF THE INVENTION

It has been discovered that the viscosity of organic liquids may be conveniently controlled by incorporating in said organic liquid a minor amount of a polymer which is a sulfomaleic anhydride adduct with an unsaturated hydrocarbon which has been hydrolyzed and neutralized.

BRIEF DESCRIPTION OF THE DRAWINGS

FIG. 1 illustrates a graph of viscosity versus concentration for various polymer solutions. The differences between salts of sulfonated EPDM and salts of sulfomaleated EPDM are demonstrated. The latter viscosify much more efficiently in the pressure of polar compounds, such as methanol.

GENERAL DESCRIPTION

The present invention relates to polymers which are sulfomaleic anhydride adducts with unsaturated hydrocarbons which are formed by reacting sulfomaleic anhydride with an unsaturated hydrocarbon in either the solution or the bulk state.

Sulfomaleic anhydride which is represented by the formula:

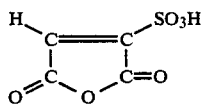

is formed by reacting maleic anhydride with sulfur trioxide. Besides sulfomaleic anhydride, one can also employ sulfomaleic acid, sulfofumaric acid, sulfoacrylic anhydride and their various esters, derivatives of either or both of the carboxyl groups.

Examples of sulfomaleic anhydride, its isomers and derivatives which are suitable for this reaction include, but are not limited to, the following:

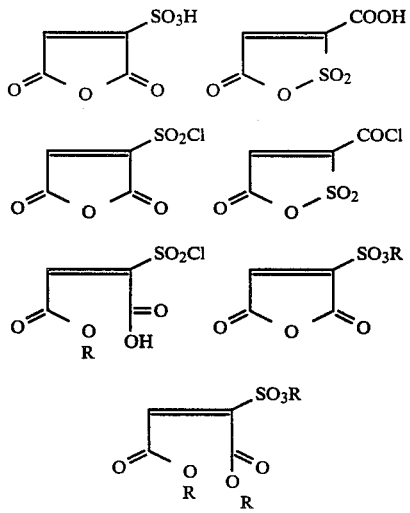

where R=H, alkyl, alkylsilyl, aryl, etc.

The sulfomaleic anhydride is reacted with an unsaturated hydrocarbon polymer which is selected from the group consisting of EPDM terpolymers, EPR, polyisoprene, polybutadienes, Butyl rubber, styrene-butadiene and styrene-isoprene "random" and block copolymers, Butyl rubbers, polybutenes, hydrocarbon resins such as Escorez resins, etc. Oligomers or polymers which have olefin functionality near the end of the chain are of interest. Such molecules include, but are not limited to, polyisobutene and polybutenes of various molecular weights. Vistanex, Vistanex J are examples of such polymers. Plastics such as polyethylene and polypropylene containing low levels of unsaturation are also suitable polyolefins.

The expression "Butyl rubber", as employed in the specification and claims, is intended to include copolymers made from a polymerization reaction mixture having therein from 70 to 99.5% by weight of an isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight as measured by GPC of about 20,000 to about 500,000, preferably about 25,000 to about 400,000 especially about 100,000 to about 400,000 and a Wijs Iodine No. of about 0.5 to 50, preferably 1 to 15. The preparation of Butyl rubber is described in U.S. Pat. No. 2,356,128, which is incorporated herein by reference.

For the purposes of this invention, the Butyl rubber may have incorporated therein from about 0.2 to 10% of combined multiolefin; preferably about 0.5 to about 6%; more preferably, about 1 to about 4%, e.g., 2%.

Illustrative of such a Butyl rubber is Exxon Butyl 365 (Exxon Chemical Co.), having a mole percent unsaturation of about 2.0% and a Mooney viscosity (ML, 1+3. 212° F.) of about 40 to 50.

Low molecular weight Butyl rubbers, i.e. Butyl rubbers having a viscosity average molecular weight of about 5,000 to 85,000, and a mole percent unsaturation of about 1 to about 5%, may be sulfonated to produce the polymers useful in this invention. Preferably, these polymers have a viscosity average molecular weight of about 25,000 to about 60,000.

The EPDM terpolymers are low unsaturated polymers having about 0.5 to about 10.0 wt.% olefinic unsaturation, more preferably about 2 to about 8, most preferably about 3 to 7 defined accordingly to the definition as found in ASTM-1418-64 and is intended to mean terpolymers containing ethylene and propylene in the backbone and an olefin residue in the side chain as a result of multi-olefin incorporation in the backbone. Illustrative methods for producing these terpolymers are found in U.S. Pat. No. 3,280,082, British Pat. No. 1,030,289 and French Patent No. 1,386,600, which are incorporated herein by reference. The preferred polymers contain about 40 to about 75 wt.% ethylene and about 1 to about 10 wt.% of a diene monomer, the balance of the polymer being propylene. Preferably, the polymer contains about 45 to about 70 wt.% ethylene, e.g. 50 wt.% and about 2.6 to about 8.0 wt.% diene monomer, e.g. 5.0 wt.%. The diene monomer is preferably a nonconjugated diene.

Illustrative of these nonconjugated diene monomers which may be used in the terpolymer (EPDM) are 1,4-hexadiene, dicyclopentadiene, 5-ethylidene-2-norbornene, 5-methylene-2-norbornene, 5-propenyl-norbornene, methyl tetrahydroindene and 4-methyl-5-methylene-2-norbornene.

A typical EPDM is Vistalon 2504 (Exxon Chemical Co.), a terpolymer having a Mooney viscosity (ML, 1+8, 212° F.) of about 40 and having an ethylene content of about 50 wt.% and a 5-ethylidene-2-norbornene content of about 5.0 wt.%. The $\overline{M}_n$ as measured by GPC of Vistalon 2504 is about 47,000, the $\overline{M}_v$ as measured by GPC is about 145,000 and the $\overline{M}_w$ as measured by GPC is about 174,000.

Another EPDM terpolymer Vistalon 2504-20 is derived from Vistalon 2504 (Exxon Chemical Co.) by a controlled extrusion process, wherein the resultant Mooney viscosity at 212° F. is about 20. The $\overline{M}_n$ as measured by GPC of Vistalon 2504-20 is about 26,000, the $\overline{M}_v$ as measured by GPC is about 90,000 and the $\overline{M}_w$ as measured by GPC is about 125,000.

Nordel 1320 (Dupont) is another terpolymer having a Mooney viscosity at 212° F. of about 25 and having about 53 wt.% of ethylene, about 3.5 wt.% of 1,4-hexadiene, and about 43.5 wt.% of propylene.

The EPDM terpolymers of this invention have a number average molecular weight ($\overline{M}_n$) as measured by GPC of about 10,000 to about 200,000, more preferably of about 15,000 to about 100,000, most preferably of about 20,000 to about 60,000. The Mooney viscosity (ML, 1+8, 212° F.) of the EPDM terpolymer is about 5 to about 60, more preferably about 10 to about 50, most preferably about 15 to about 40. The $\overline{M}_v$ as measured by GPC of the EPDM terpolymer is preferably below about 350,000 and more preferably below about 300,000. The $\overline{M}_w$ as measured by GPC of the EPDM terpolymer is preferably below about 500,000 and more preferably below about 350,000.

Other suitable olefin polymers include polymers comprising a major molar amount of $C_2$ to $C_5$ monoolefins, e.g., ethylene, propylene, butylene, isobutylene and pentene. The polymers may be homopolymers such as polyisobutylene, as well as copolymers of two or more such olefins such as copolymers of ethylene and propylene, butylene and isobutylene, propylene and isobutylene and the like.

The reaction of the sulfomaleic anhydride or its ester derivatives with the unsaturated hydrocarbon polymer can occur in solution, in a melt and in polymer processing equipment such as a rubber mill, a Brabender, an extruder or a Banbury mixer.

The sulfonic acid group of the sulfomaleic anhydride can be neutralized with ammonia, primary secondary or tertiary amines including the aforementioned amino compounds, or metal counterion selected from the group consisting of iron, lead, aluminum and groups IA, IIA, IB and IIB of the Periodic Table of Elements. The neutralization of the sulfonic acid groups of the sulfomaleic anhydride adduct of the unsaturated hydrocarbon polymer can be accomplished either in solution, in a melt or in polymeric processing equipment, as previously defined.

The polymer is the sulfomaleic anhydride adduct with the unsaturated hydrocarbon is incorporated into the organic liquid at a concentration level of about 0.1 to about 20 grams per 100 ml of organic liquid, more preferably about 0.5 to about 5.

The organic liquid is a hydrocarbon which has a solubility parameter of about 6 to about 10.5, wherein the organic liquid is selected from the group consisting of lubricating oils, synthetic oils, aliphatic oils, naphthenic oils, aromatic oils, aliphatic hydrocarbons, aromatic hydrocarbons and naphthenic hydrocarbons. The organic liquid has a viscosity at 100° F. of less than about 35 centipoises.

The method of the instant invention includes incorporating a cosolvent, for example a polar cosolvent, into the mixture of organic liquid and the polymer to solubilize the pendant ionomeric groups. The polar cosolvent will have a solubility parameter of at least 10.0, more preferably at least 11.0, and may comprise from 0.1 to 40 weight percent, preferably 0.5 to 20 weight of the total mixture of organic liquid, ionomeric polymer and polar cosolvent.

While this definition of polar cosolvent is adequate, we also observe that cosolvents with especially long alkyl groups with hydroxyl groups on one or both ends are especially preferred. These cosolvents are based on $C_{10}$–$C_{30}$ alkyl chains.

In addition to the requirements for ionic polymer, organic liquid and polar solvent there is the additional and more important constraint that the polar cosolvent be more polar than the organic liquid. This is required in order that the proper interaction between polar cosolvent and ionic groups be obtained. If we designate the solubility parameter of the organic liquid as $S_L$ and the solubility parameter of the polar cosolvent as $S_p$ then we require that:

$$S_p \leq +1.0.$$

In other words, the polar cosolvent will be substantially more polar than the organic liquid to be thickened.

Normally the polar cosolvent will be a liquid at room temperature, however, this is not a requirement. It is required that the polar cosolvent be soluble or miscible with the organic liquid at the levels employed in this invention. Under normal circumstances this miscibility requirement precludes the use of water as a polar cosolvent. The polar cosolvent must be present in amounts of from 20 to 600 moles per mole of ionic group in order go give the desirable results of the instant invention and preferably from 30 to 400 moles per mole of ionic group. This level of cosolvent is desirable in creating solutions which can be isoviscous with temperature on concentration.

DESCRIPTION OF THE PREFERRED EMBODIMENTS

The following examples illustrate the present invention without, however, limiting the same hereto.

EXAMPLE 1

EPDM Rubber with Sulfomaleic Anhydride

A solution of 50 g of dry EPDM Rubber (Vistalon 2504) in 1000 ml of dry xylene was heated at 130° C. and stirred under nitrogen and 2.67 g (15 mmole) of sulfomaleic anhydride was added and heating continued for 4 hours.

After cooling the sulfonic acid was neutralized and the anhydride reacted with excess methyl amine (21.2 g). The polymer solution became extremely viscous and began to climb the stirrer indicating that a polymeric methylammonium sulfonate ionomer had been formed. Methanol (50 ml) was added to attenuate the strong intermolecular associations and the viscosity decreased.

After standing overnight the polymer was precipitated in a high speed mixer with 4000 ml of isopropyl alcohol-water (70:30), collected on a filter and washed again in the mixer with another portion of IPA-water. A small quantity of Irganox 1010 antioxidant was added and the polymer filtered and vacuum dried at 50° C.

Microanalysis indicated that the resulting product contained 0.46% S (14.2 mmole/100 g) and 0.265% N (18.9 mmole/100 g).

Treatment of a solution of the modified polymer in 95:5 toluene methanol with excess sodium methoxide in methanol to free ionically bound methylamine and isolation as the sodium salt gave a product whose analysis showed 0.40% S (12.5 mmole/100 g) and 0.115% N (8.2 mmole/100 g).

EXAMPLE 2

EPDM Rubber with Chlorosulfonyl Maleic Anhydride

According to the method of example 1, 2.95 g of chlorosulfonylmaleic anhydride was reacted with 50 g of Vistalon 2504 EPDM rubber, followed by reaction of the sulfonyl chloride and carboxylic anhydride groups with excess methylamine. The polymer was isolated and cleaned as in Example 1.

Microanalysis indicated the presence of 0.46% S (14.2 mmole/100 g) and 0.359% N (25.6 meq/100 g). Some gelation of the polymer product was observed.

Treatment of this polymer with sodium methoxide solution and isolation as in Example 1 gave a product whose microanalysis showed 0.39% S (12.2 mmole/100 g) and 0.194% N (13.8 mmole/100 g).

EXAMPLE 3

Butyl Rubber with Chlorosulfonyl Maleic Anhydride

According to the method of Example 1, 2.95 g of chlorosulfonyl maleic anhydride was reacted with 50 g of Butyl Rubber (Exxon 365 Butyl Rubber). After treatment with methylamine, the isolated polymer contained 0.47% S (14.7 mmole/100 g) and 0.468% N (33.4 mmole/100 g). Further reaction with sodium methoxide gave a polymer whose elemental analysis showed 0.45% S (14.4 mmole/100 g) and 0.215% N (15.3 mmole/100 g).

EXAMPLE 4

EPDM Rubber with 2-Chloroformyl-3-SulfoAcrylic Anhydride

According to the method of example 1, 50 g of EPDM (V-2504) and 2.95 g of 2-chloroformyl-3-sulfoacrylic anhydride were reacted. After treatment with methylamine the isolated polymer contained 0.40% S (12.5 mmole/100 g) and 0.445% N (32.1 mmole/100 g). After treatment with sodium methoxide the isolated polymer gave the following microanalysis: 0.52% S (16.3 mmole/100 g) and 0.205% N (14.6 mmole/100 g).

EXAMPLE 5

EPDM Rubber with the Methyl Ester of Chlorosulfonyl Maleic Anhydride.

Chlorosulfonyl maleic anhydride was reacted with one molar equivalent of methanol in chloroform solution. The chloroform was removed under vacuum and 3.43 g of the resulting product was reacted with 50 g of V-2504 EPDM according to the method of Example 1. After treatment with methylamine, the isolated polymer, according to microanalysis contained 0.38% S (11.9 mmole/100 g) and 0.17% N (12.8 mmole/100 g). After treatment with sodium methoxide the analysis showed 0.36% S (11.2 mmole/100 g) and 0.089% N (6.4 mmole/100 g).

EXAMPLE 6

Conjugated Diene Butyl with Sulfomaleic Anhydride

According to the method of example 1, 2.67 g of sulfomaleic anhydride was reacted with 50 g of CD Butyl 7614. After treatment with methylamine and isolation the product contained 0.38% S (11.9 mmole/100 g) and 0.248% N (17.7 mmole/100 g).

EXAMPLE 7

Bulk Reaction of EPDM with Sulfomaleic Anhydride

Vistalon 2504 EPDM (50 g) was fluxed on a 3" electric mill at 120° C. Sulfomaleic anhydride (1.05 g) was added slowly. After the addition was complete the sample was mixed for a few minutes and zinc stearate (2.35 g) was added and mixing continued for a few minutes longer.

The resulting product was a tough, elastic material that resembled a cross-linked rubber. However, the product was soluble in 95:5 toluene:methanol indicating that the product was a thermoplastic elastic "ionomer".

EXAMPLE 8

Polyisobutylene with Sulfomaleic Anhydride

About 250 g of polyisobutylene ($\overline{M}n=900$) was dissolved in 200 ml of xylene at room temperature under a nitrogen blanket. To the stirred xylene solution was gradually added 60 g of sulfomaleic anhydride at about 35° C. The reaction mixture was refluxed for about eight hours, and then concentrated by roto-evaporation. The residue was taken up in 2.5 L of ether and washed twice with 500 ml portions of water. The ether solution was dried over $MgSO_4$, filtered, and concentrated by roto-evaporation to give a sulfomaleated product which analyzed for 0.33% sulfur.

EXAMPLE 9

Sulfonated EPDM Thermoplastic Elastic Ionomers from EPDM and Sulfomaleic Anhydride Royalene 521 EPDM rubber, 50 g (mill dried) dissolved in 1,000 ml dry xylene was treated with 2.67 g of sulfomaleic anhydride for 4 hours at 130° C. After cooling, the resulting product was neutralized with either zinc methoxide, sodium methoxide or zinc acetate in methanol. A substantial viscosity increase was noted upon addition of the base. Additional methanol was added when necessary to reduce the viscosity. Stirring was continued to 0.5 hour and the polymer was isolated from isopropanol in a high speed mixer. The resulting crumb was dried in a vacuum oven at 50° C.

EXAMPLE 10

Sulfonated EPDM Thermoplastic Elastic Ionomers from EPDM and Sulfomaleic Anhydride Ester (Methoxysulfonyl Maleic Anhydride)

According to the method of the previous Example Royalene 521 EPDM rubber in xylene was reacted with sulfomaleic anhydride methyl ester or sulfomaleic anhydride trimethyl silylester at the rate of 10 or 30 mmole per 100 g of polymeric and the product neutralized and isolated as before.

EXAMPLE 11

Sulfomaleic anhydride or maleic anhydride sulfoester-adducts with EPDM were hydrolyzed and neutralized during isolation. Solutions were prepared in xylene-methanol at several concentrations of polymer and varying methanol content. A comparison of a zinc salt of said polymer with zinc salts of sulfo-EPDM's shows that the material of the instant invention is much more efficient at viscosification than ordinary sulfonated EPDM zinc polymers. Even at higher sulfonation levels ordinary sulfonated EPDM's were inefficient in the presence of methanol.

Since many modifications and variations of this invention may be made without departing from the spirit or scope of the invention, it is not intended to limit the spirit or scope hereof to the specific Examples hereof.

What is claimed is:

1. A method for controlling the viscosity of organic liquids, said organic liquid having a solubility parameter of from about 6 to about 10.5, which comprises incorporating in said organic liquid a minor amount of a polymer which is a hydrolyzed and neutralized sulfomaleic anhydride adduct or sulfoester maleic anhydride adduct with an unsaturated hydrocarbon polymer.

2. The method of claim 1, further including a polar cosolvent wherein said polar cosolvent comprises from about 0.1 to about 40 weight percent of the total mixture of said organic liquid, said polymer and said polar cosolvent.

3. A method according to claim 1 wherein said unsaturated hydrocarbon polymer is selected from the group consisting of ethylene propylene terpolymers, ethylene propylene copolymers, polyisoprene, Butyl, rubber, polybutadiene, and styrene-butadiene and styrene-isoprene random and block copolymers, polypropylenes and polyisobutylenes, as well as plastic polypropylene copolymers or polyethylene copolymers.

4. A method according to claim 2 wherein the sulfonic acid groups of the sulfomaleic anhydride adduct with the unsaturated hydrocarbon polymer are neutralized with a metal counterion selected from the group consisting of iron, aluminum, lead and Groups IA, IIA, IB and IIB of the Periodic Table of Elements.

5. A method according to claim 1 wherein the sulfonic acid groups of the sulfomaleic anhydride adduct with the unsaturated hydrocarbon polymer is neutralized with ammonia or an organic amine.

6. The method of claim 1 wherein said polymer is incorporated into said organic liquid at a level of from 0.01 to 20 grams/100 ml.

7. The method of claim 1 wherein said organic liquid has a viscosity at 100° F. of less than 35 centipoises.

8. The method of claim 1 wherein said organic liquid is a lubricating oil.

9. The method of claim 1 wherein said polar cosolvent is selected from the group consisting of alcohols and amines.

* * * * *